US012549039B2

(12) United States Patent
Lu

(10) Patent No.: US 12,549,039 B2
(45) Date of Patent: Feb. 10, 2026

(54) WIRELESSLY NOTIFYING A TRANSPORT TO PROVIDE A PORTION OF ENERGY

(71) Applicant: TOYOTA MOTOR NORTH AMERICA, INC., Plano, TX (US)

(72) Inventor: Norman Lu, Fairview, TX (US)

(73) Assignee: TOYOTA MOTOR NORTH AMERIC, INC., Plano, TX (US)

( * ) Notice: Subject to any disclaimer, the term of this patent is extended or adjusted under 35 U.S.C. 154(b) by 687 days.

(21) Appl. No.: 18/081,594

(22) Filed: Dec. 14, 2022

(65) Prior Publication Data

US 2023/0118100 A1 Apr. 20, 2023

Related U.S. Application Data

(63) Continuation of application No. 16/821,905, filed on Mar. 17, 2020, now Pat. No. 11,552,507.

(51) Int. Cl.

| | |
|---|---|
| ***H02J 50/12*** | (2016.01) |
| ***B60L 53/12*** | (2019.01) |
| ***B60L 53/63*** | (2019.01) |
| ***B60L 53/66*** | (2019.01) |
| ***H02J 7/00*** | (2006.01) |
| ***H02J 50/80*** | (2016.01) |

(52) U.S. Cl.

CPC .............. *H02J 50/80* (2016.02); *B60L 53/12* (2019.02); *B60L 53/63* (2019.02); *B60L 53/66* (2019.02); *H02J 7/00034* (2020.01); *H02J 50/12* (2016.02)

(58) Field of Classification Search

USPC ................. 320/106, 107, 108, 109, 110, 112

See application file for complete search history.

(56) References Cited

U.S. PATENT DOCUMENTS

| | | | |
|---|---|---|---|
| 7,956,570 | B2 | 6/2011 | Lowenthal et al. |
| 8,154,246 | B1 | 4/2012 | Heitmann |
| 8,676,636 | B2 | 3/2014 | Genschel et al. |
| 8,698,642 | B2 | 4/2014 | Taguchi |
| 8,796,881 | B2 | 8/2014 | Davis |
| 8,860,362 | B2 | 10/2014 | Kamen et al. |
| 9,024,571 | B2 | 5/2015 | Uyeki |
| 9,026,347 | B2 | 5/2015 | Gadh et al. |
| 9,302,594 | B2 | 4/2016 | Tripathi et al. |
| 9,371,007 | B1 | 6/2016 | Penilla et al. |
| 9,381,821 | B2 | 7/2016 | Keeling et al. |
| 9,429,974 | B2 | 8/2016 | Forbes, Jr. |
| 9,493,087 | B2 | 11/2016 | Leary |

(Continued)

FOREIGN PATENT DOCUMENTS

| | | | |
|---|---|---|---|
| AU | 2012100463 | A4 | 5/2012 |
| CN | 101678774 | A | 3/2010 |

(Continued)

OTHER PUBLICATIONS

EP Office Action dated Apr. 5, 2022, issued in EP Application No. 2163080.1.

(Continued)

*Primary Examiner* — Brian Ngo

(57) ABSTRACT

An example operation includes one or more of wirelessly notifying, via a charging station, at least one transport of a group of identified transports of a needed amount of energy stored in the at least one transport prior to the at least one transport being connected to the charging station.

20 Claims, 16 Drawing Sheets

100

Communications 116

Transport 110

Other Transport 112

Charging Station 114

Electrical Grid 142

(56) References Cited

U.S. PATENT DOCUMENTS 9,739,844 B2 8/2017 Widmer et al.
9,744,858 B2 8/2017 Hall et al.
9,754,300 B2 9/2017 Kempton et al.
9,778,653 B1 10/2017 McClintock et al.
9,873,408 B2 1/2018 Capizzo
9,881,259 B2 1/2018 Forbes, Jr.
9,931,952 B2 4/2018 Tripathi et al.
9,969,288 B2 5/2018 Ikeda et al.
9,994,118 B2 6/2018 Williams et al.
10,029,577 B2 7/2018 Widmer et al.
10,252,631 B2 4/2019 Ricci
10,343,537 B2 7/2019 Widmer et al.
10,384,775 B2 8/2019 Krishnamoorthy et al.
10,414,283 B2 9/2019 Kudo et al.
10,981,464 B1 4/2021 Sun
11,108,090 B2 8/2021 Yokoyama et al.
11,571,983 B2 2/2023 Lu
11,993,170 B2 5/2024 Lu
2007/0282495 A1 12/2007 Kempton et al.
2008/0040223 A1 2/2008 Bridges et al.
2008/0040295 A1 2/2008 Kaplan et al.
2008/0281663 A1 11/2008 Hakim et al.
2009/0085522 A1 4/2009 Matsumoto
2009/0222143 A1 9/2009 Kempton
2009/0224939 A1 9/2009 Stocker et al.
2010/0242906 A1 9/2010 Konezny
2011/0221393 A1 9/2011 Billmaier
2011/0276448 A1 11/2011 Perper et al.
2012/0025764 A1 2/2012 Lee
2012/0035778 A1 2/2012 Kong
2012/0109798 A1 5/2012 Shelton et al.
2012/0169282 A1 7/2012 Helnerus et al.
2012/0245750 A1 9/2012 Paul et al.
2012/0299373 A1 11/2012 Yoshida
2012/0303259 A1 11/2012 Prosser
2013/0119920 A1 5/2013 Hsu et al.
2013/0166096 A1 6/2013 Jotanovic
2013/0218458 A1 8/2013 Scholl
2013/0342310 A1 12/2013 Park et al.
2014/0167678 A1 6/2014 Guillou et al.
2015/0069970 A1 3/2015 Sarkar et al.
2015/0286365 A1 10/2015 Mizukami et al.
2015/0298565 A1 10/2015 Iwamura et al.
2015/0306967 A1 10/2015 Cohen
2015/0354974 A1 12/2015 Takehara et al.
2015/0360578 A1 12/2015 Duan et al.
2016/0075247 A1 3/2016 Uyeki
2016/0288653 A1 10/2016 Tsukamoto
2017/0146354 A1* 5/2017 Boss ................. G01C 21/3438
2017/0259674 A1 9/2017 Yonehana
2017/0282736 A1 10/2017 Goei
2017/0282744 A1* 10/2017 Koo .................... G07C 5/0825
2017/0355354 A1 12/2017 Hassounah
2017/0358041 A1 12/2017 Forbes, Jr. et al.
2018/0111494 A1 4/2018 Penilla et al.
2018/0118045 A1 5/2018 Gruzen et al.
2018/0143035 A1 5/2018 Ricci
2018/0238698 A1 8/2018 Pedersen
2018/0345807 A1 12/2018 Cun
2018/0345808 A1 12/2018 Cun
2019/0009756 A1 1/2019 Jacobs
2019/0061546 A1 2/2019 Miftakhov
2019/0107406 A1 4/2019 Cox et al.
2019/0122561 A1 4/2019 Shimizu et al.
2019/0202315 A1 7/2019 Wilding et al.
2019/0217735 A1 7/2019 Donnelly et al.
2019/0275892 A1 9/2019 Williams et al.
2019/0280509 A1 9/2019 Yokoyama et al.
2019/0285892 A1 9/2019 Yang
2019/0308513 A1 10/2019 Akhavan-Tafti
2019/0315236 A1 10/2019 Mere
2019/0337392 A1 11/2019 Joshi et al.
2020/0101850 A1 4/2020 Harty et al.
2020/0144838 A1 5/2020 Penilla et al.
2020/0175614 A1 6/2020 Fox et al.
2020/0217679 A1* 7/2020 DeLuca ............ G01C 21/3484
2020/0218270 A1 7/2020 Gu et al.
2020/0226305 A1 7/2020 Trivelpiece et al.
2020/0262305 A1 8/2020 Chakraborty et al.
2020/0276910 A1 9/2020 Harty et al.
2020/0282859 A1 9/2020 Shin
2020/0353839 A1 11/2020 Tarchinski et al.
2021/0074094 A1 3/2021 Schumacher
2021/0199467 A1 7/2021 Bellifemine et al.
2021/0213846 A1 7/2021 Sun et al.
2021/0213848 A1 7/2021 Sun
2021/0256472 A1 8/2021 Javidan et al.
2021/0291671 A1 9/2021 Lu
2021/0291691 A1 9/2021 Lu
2021/0331603 A1 10/2021 Brombach et al.

FOREIGN PATENT DOCUMENTS

CN 102891505 A 1/2013
CN 101938146 B 12/2014
CN 104520133 A 4/2015
CN 103010040 B 6/2015
CN 104701931 A 6/2015
CN 104753164 A 7/2015
CN 103855767 B 10/2015
CN 105356459 A 2/2016
CN 103915869 B 4/2016
CN 103562001 B 5/2016
CN 102947124 B 2/2017
CN 108054773 A 5/2018
CN 109177765 A 1/2019
CN 109334482 A 2/2019
CN 109398149 A 3/2019
CN 107176041 B 11/2019
DE 202012105091 U1 6/2013
DE 202010018487 U1 1/2017
JP 2007020397 A 1/2007
JP 2009118652 A 5/2009
JP 2011197932 A 10/2011
JP 4893653 B2 3/2012
JP 2012120295 A 6/2012
JP 2013104683 A 5/2013
JP 2014056589 A 3/2014
JP 6117868 B2 4/2017
JP 2017096497 A 6/2017
JP 6190948 B2 8/2017
JP 2018117517 A 7/2018
JP 6399928 B2 10/2018
JP 2019075134 A 5/2019
JP 2019083528 A 5/2019
KR 101033880 B1 5/2011
KR 20120062089 A 6/2012
KR 20140078623 A 6/2014
KR 20140109568 A 9/2014
KR 20150079613 A 7/2015
KR 20180091976 A 8/2018
TW 201722025 A 6/2017
WO 2010060720 A2 6/2010
WO 2011039284 A2 4/2011
WO 2011102857 A1 8/2011
WO 2012098660 A1 7/2012
WO 2013061410 A1 5/2013
WO 2013108246 A2 7/2013
WO 2017094431 A1 6/2017
WO 2018196803 A1 11/2018

OTHER PUBLICATIONS

EP Search Report issued in the related EP International Application No. EP21163080, mailed on Jul. 30, 2021.
Notice of Reasons for Rejection issued in the JP Patent Application No. 2021-042261, mailed on Aug. 23, 2022.
Notification of the First Office Action issued in the CN Application No. 202110279683.9, mailed on Apr. 15, 2023.

(56) References Cited

OTHER PUBLICATIONS

Final Office Action issued in CN Application No. 202110279683.9, mailed on Feb. 20, 2024.

* cited by examiner

100

120

150

160

200

210

300

550

WIRELESSLY NOTIFYING A TRANSPORT TO PROVIDE A PORTION OF ENERGY

CROSS-REFERENCE TO RELATED APPLICATIONS

This application is a Continuation of U.S. patent application Ser. No. 16/821,905 entitled, "WIRELESSLY NOTIFYING A TRANSPORT TO PROVIDE A PORTION OF ENERGY," filed on Mar. 17, 2020, which was cross-referenced to the following commonly assigned U.S. patent applications filed on Mar. 17, 2020: U.S. patent application Ser. No. 16/821,923 entitled, "DISTANCE-BASED ENERGY TRANSFER FROM A TRANSPORT"; U.S. patent application Ser. No. 16/821,951 entitled, "MOBILE TRANSPORT FOR EXTRACTING AND DEPOSITING ENERGY"; U.S. patent application Ser. No. 16/821,961 entitled, "EXECUTING AN ENERGY TRANSFER DIRECTIVE FOR AN IDLE TRANSPORT"; and U.S. patent application Ser. No. 16/821,974 entitled, "TRANSPORT-BASED ENERGY ALLOCATION," each of which is incorporated by reference herein for all purposes.

TECHNICAL FIELD

This application generally relates to electric vehicle power transfer, and more particularly, wirelessly notifying a transport to provide a portion of energy.

BACKGROUND

Currently, charging stations provide power from an electrical source provider to an electric transport. The charging station has little intelligence and communicates with the transport through a wired connection with information pertaining strictly to the delivery of the power to the transport battery.

As such, what is sought is a charging station that communicates with transports wirelessly to perform an additional role and/or a different role as a wireless communicator pertaining to the delivery of power from the transport back to the charging station.

SUMMARY

One example embodiment provides a method that includes one or more of wirelessly notifying, via a charging station, at least one transport of a group of identified transports of a needed amount of energy stored in the at least one transport prior to the at least one transport being connected to the charging station.

Another example embodiment provides a system, comprising, a charging station configured to perform one or more of wirelessly notify at least one transport of a group of identified transports of a needed amount of energy stored in the at least one transport prior to the at least one transport being connected to the charging station.

A further example embodiment provides a non-transitory computer readable medium comprising instructions, that when read by a processor, causes the processor to perform one or more of wirelessly notifying, via a charging station, at least one transport of a group of identified transports of a needed amount of energy stored in the at least one transport prior to the at least one transport being connected to the charging station.

DETAILED DESCRIPTION

Figure 1A:
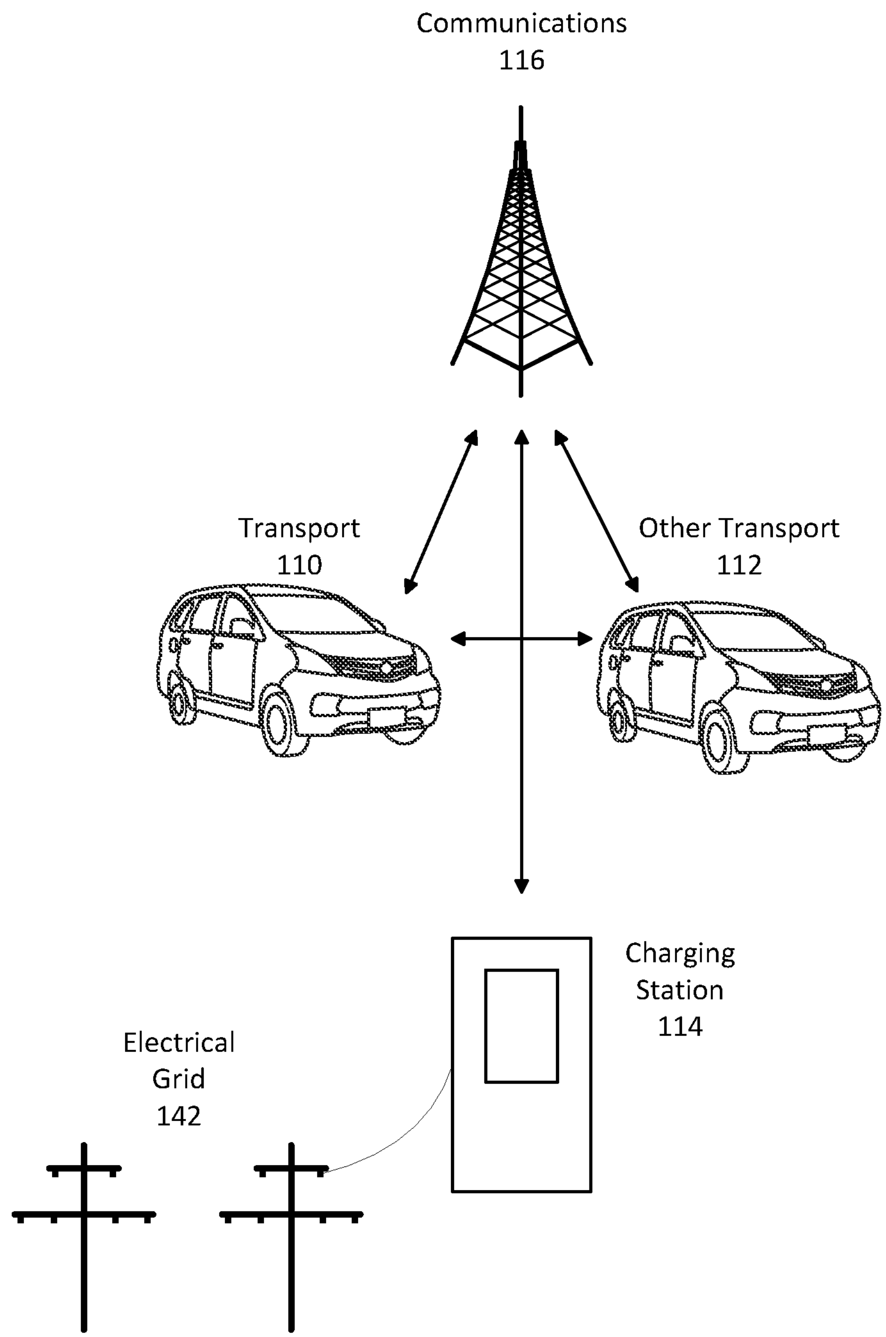
FIG. 1A illustrates a first example power return notification system overview, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current solution, a transport may include one or more of vehicles, cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

In an embodiment of the current solution, the charging station takes on an additional role and/or a different role as a wireless communicator with transports. The disclosed charging stations communicate the power needs of the system(s) in which it is in communication with (or the needs of the charging station(s) themselves), receives energy from the transport for delivery to the local electrical grid or locale and is aware of the locations, direction of travel and status of various electric transports.

Another embodiment of the current solution wirelessly notifies a transport to provide a portion of an amount of energy prior to the coupling of the transport and charging station, and provides intelligence between the charging station and the transport, allowing the processor of the charging station to wireless communicate with the transport regarding an amount of energy store in a battery/batteries on the transport. The processor and/or other devices such as a transceiver, transmitter, receiver, sensor and the like of the charging station is configured to communicate with one or more processors and/or other devices such as a transceiver, transmitter, receiver, sensor and the like of the transport to determine a current battery charge, and to provide a fraction of the charge to the charging station. In one example the coupling of the transport and the charging station may be by way of direct electrical connection, inductive coupling and the like.

In an embodiment of the current solution, the charging station acts as a vehicle energy director and a bi-directional energy transit/transfer device in which energy needs are met both from the electrical grid to an endpoint and from an endpoint to the electrical grid. The endpoint may be a vehicle, a dwelling, another charging station, and the like. This bi-directionality of energy flow is performed by the current solution that has expanded intelligence into the transports surrounding it. The expanded intelligence of the charging station may include transport status information such as the current state of charge of the transport, its location, direction of travel, endpoint, other stops, its current usage rate, and the like received via wireless communication from the transport. The charging station may determine an additional amount of energy that the transport will require to complete its route, this information may also be wirelessly communicated by the transport to the charging station as transport status information. The charging station may additionally store previous transport status information from previous interactions with the transport and based on these previous interactions form a historical travel pattern for that transport.

The charging stations may communicate with one another to provide information related to a direction of transit travel, state of charge, a transit time to the charging station(s), etc. In this current solution, the charging stations, in one embodiment, can communicate with one another as well as transiting vehicles, keeping track of their energy needs and excess energy storage capacity. This information is used to select specific vehicle(s) based on a current energy storage of the vehicle(s) and a time to a charging station. In other embodiments, an estimated time that will be spent by the vehicle discharging at the charging station may also be determined and used to select the specific vehicle(s) as well as to manage the ingress and egress of vehicle(s) at the charging station to provide additional power to the electrical grid (FIG. 1A, 142). The estimated time spent by a vehicle discharging at the charging station may be based on the state of charge of the transport, the type of transport, the type of energy storage, the type of electrical current connection and the like. The communication between charging stations may be one of wireless, wired, network, internet based and the like.

In one example embodiment, the charging station wirelessly notifies a transport of a group of transports about which it is aware, traveling toward it and having excess energy to provide a needed amount of energy that the transport has and can spare to the charging station.

In one embodiment the charging station may wirelessly communicate with and may be aware of the group of electric transports in its vicinity, their direction of travel and their state of charge of the individual transiting transport batteries. In one embodiment the transport storage unit may be comprised of capacitors, super-capacitors and the like. In one embodiment, the transports that are in wireless communication with the charging station send status information to the charging station pertaining to the vehicle including one or more of: its current state, location, travel itinerary, load, energy usage per mile and the like. The charging station gathers the status information to form a status matrix of the transports that the charging station is in communication with. This status matrix may be used as the basis of decisions made by the charging station about the group of transports traveling toward the charging station. The status matrix may be utilized to select potential candidates to transfer some of their energy to the charging station. The status matrix may be stored at the charging station, in the cloud or on a server communicably coupled to the charging station. The status information associated with the transport may be stored locally in the transport, in the cloud or on a server communicably coupled to the transport.

In one embodiment a status matrix is maintained by the charging station. In this embodiment, the status matrix is a matrix of information for transports approaching the charging station. In other embodiments, the status matrix is maintained while the transport is within wireless communication range of the charging station or while the transport is within a distance of the charging station. This matrix of information of the transports in communication with the charging station may be utilized for decisions pertaining to energy transfer and a history of the matrix of information for the transports may be kept for subsequent historical analysis. The information maintained by the status matrix may include one or more of a state of charge, a travel direction, endpoint(s), a current location, road blockages at the location, a travel itinerary, a load, an initiation point, an endpoint, an instantaneous speed of travel, an average speed of travel, a top speed, an acceleration rate, a current energy usage rate per distance (such as mile or kilometer), an amount of charge to provide, an amount of time to spend at the charging station, current and/or future road conditions, current and/or future weather conditions, an estimated distance to the charging station, an estimated distance to a subsequent endpoints, etc. This information can be utilized to make decisions by the charging station (via one or more processors, sensors and/or memories, which can store the status matrix and/or information on the charging station or accessible by the charging station) for one or more of the transports in wireless communication with the charging station. The status matrix may also include historical travel patterns and may be based on previously stored transport status reports from previous interactions, the probability of the transport traveling directly to an endpoint on a particular day and/or stops along the way, etc.

In one example embodiment in which the status matrix has a minimal number of components, the matrix may include the identifiers for each transport it is communication with, their location with respect to the charging station, whether the transport is traveling toward the charging station, the state of charge of the transport and one or more endpoints of the transport. With that information in the matrix, a determination may be made as to which vehicle traveling toward the charging station will have the most excess energy after factoring in the energy needed to travel from the charging station to the endpoint. The transport with the greatest excess energy may be selected to transfer a portion of its excess energy back to the charging station and from there, optionally, to the electrical grid or locale. Other data may be collected as discussed previously and a different manner of selection of a transport for providing energy may be utilized.

The charging station may select potential candidates based on those transports with the largest energy reserves, the largest ratio of energy reserves to estimated energy usage, transports closest to their endpoint, transports approaching the charging station and near their endpoint, transports that will have the shortest queue time based on a current speed and energy download/expelling time of a transport and the like. The endpoint may be a vehicle, a dwelling, another charging station, and the like.

The charging station will not leave the transport energy deficient and unable to complete its journey because the charging station will have either the currently planned route of the transport via wireless transmission from the transport or access to its historical travel patterns via data stored in the transport, data stored about the transport in the charging station, data stored about the transport in the cloud, a server and the like. For example, the historical travel pattern may be based on previously stored transport status reports from previous interactions, the charging station may determine the probability of the transport traveling directly to a location on a particular day, or stops along the way, etc. This information may form a portion of the status matrix that may be utilized by the charging station to determine which vehicle(s) will form the group.

The transport wirelessly communicates with the charging station and provides one or more of its state of charge, travel direction, endpoint(s), location, an amount of charge to provide, an amount of time to spend at the charging station, and estimated distance to the charging station, estimate distance to a subsequent endpoint, etc. The transport may independently confirm how much energy it can spare.

In one embodiment, the charging station wirelessly communicates its energy need to the transport and a backup transport in case the first transport is not able or willing to transfer energy to the charging station. The system may also schedule the communications and energy transfer so that the transferring transport is at the charging station for the least amount of time in queue. High efficiency of transport energy upload throughput with minimal queue times for both the charging station and transports may be achieved by scheduling the transport for energy transfer based on a distance from the transport to the charging station and the instantaneous velocities of transports traveling toward the charging station based on their wirelessly communicated status information. The queue times may also be reduced by determining the travel time of prior transports at approximately the same distance from the charging station and scheduling the transport to arrive as the previous transport is completing its energy transfer. In some embodiments the travel times may be a function of the time of day, distance, traffic density, traffic throughput hindrances and the like.

FIG. 1A illustrates an example power return notification system overview 100. In one example, a charging station (FIG. 1A, 114) is configured to wirelessly notify at least one transport (FIG. 1A, 110) of a group of identified transports (FIG. 1A, 110 and 112) of a needed amount of energy stored in the at least one transport (FIG. 1A, 110) prior to the at least one transport being connected to the charging station (FIG. 1A, 114). The charging station may provide feedback to the transport via communications (FIG. 1A, 116).

Figure 1B:
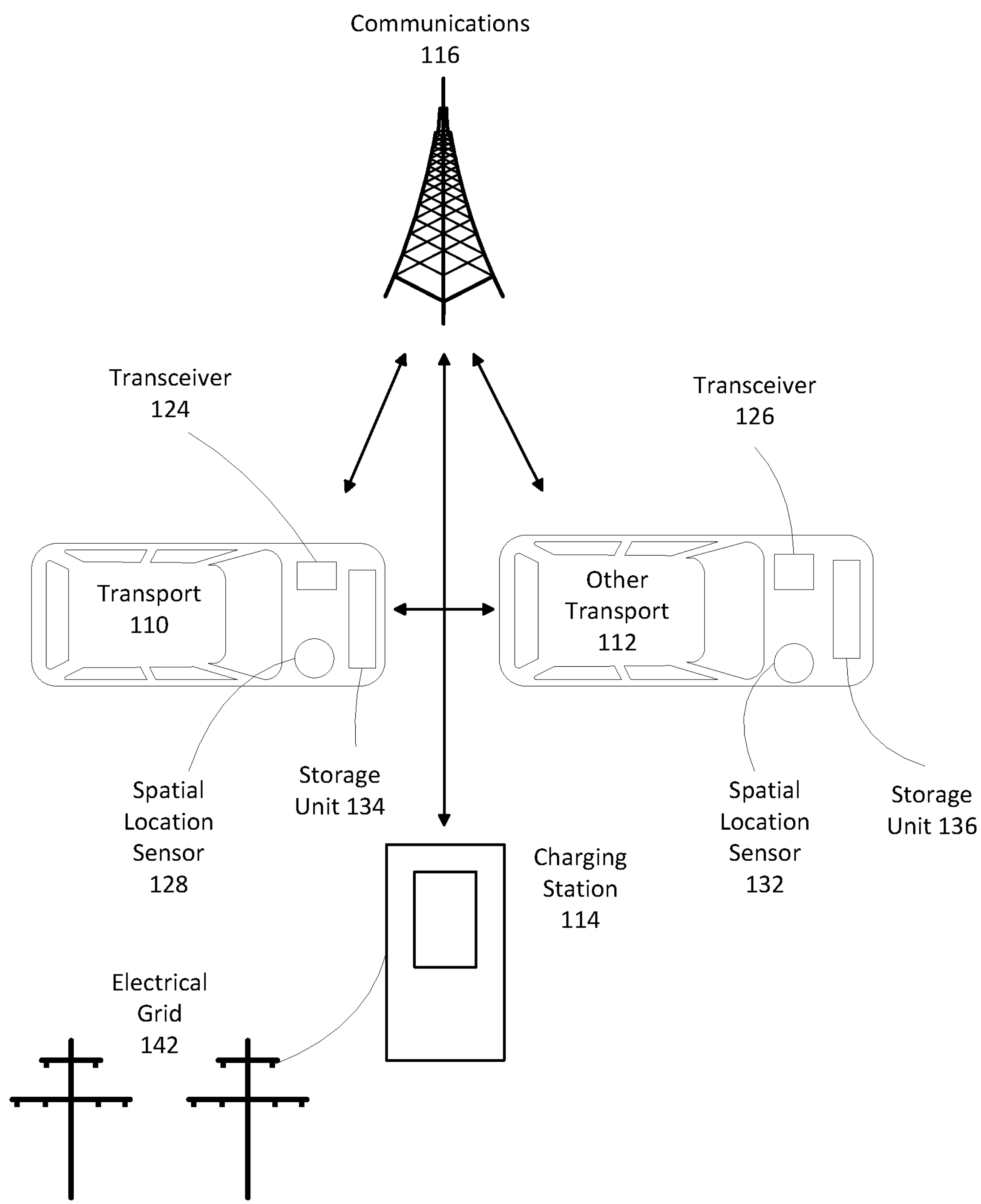
FIG. 1B illustrates a second example power return notification system overview, according to example embodiments.

FIG. 1B illustrates an example power return notification system overview 120. In another example, a charging station (FIG. 1B, 114) is configured to receive energy from a transport storage unit (FIG. 1B, 134, 136). A processor wirelessly may notify at least one transport (FIG. 1B, 110) of a group of identified transports (FIG. 1B, 110 and 112) of an indication of a needed amount of energy stored in the at least one transport (FIG. 1B, 110) prior to the at least one transport (FIG. 1B, 110) being connected to the charging station (FIG. 1B, 114). The charging station may provide feedback to the transport via communications (FIG. 1B, 116).

In yet another example embodiment, the charging station (FIG. 1B, 114) may wirelessly notify another transport (FIG. 1B, 112) of the group of identified transports (FIG. 1B, 110 and 112) of the needed amount of energy stored in the other transport (FIG. 1B, 112). The charging station (FIG. 1B, 114) may also direct the another transport (FIG. 1B, 112) to provide a portion of the amount of the energy to the charging station (FIG. 1B, 114) prior to the at least one transport (FIG. 1B, 112) being connected to the charging station (FIG. 1B, 114).

Figure 1C:
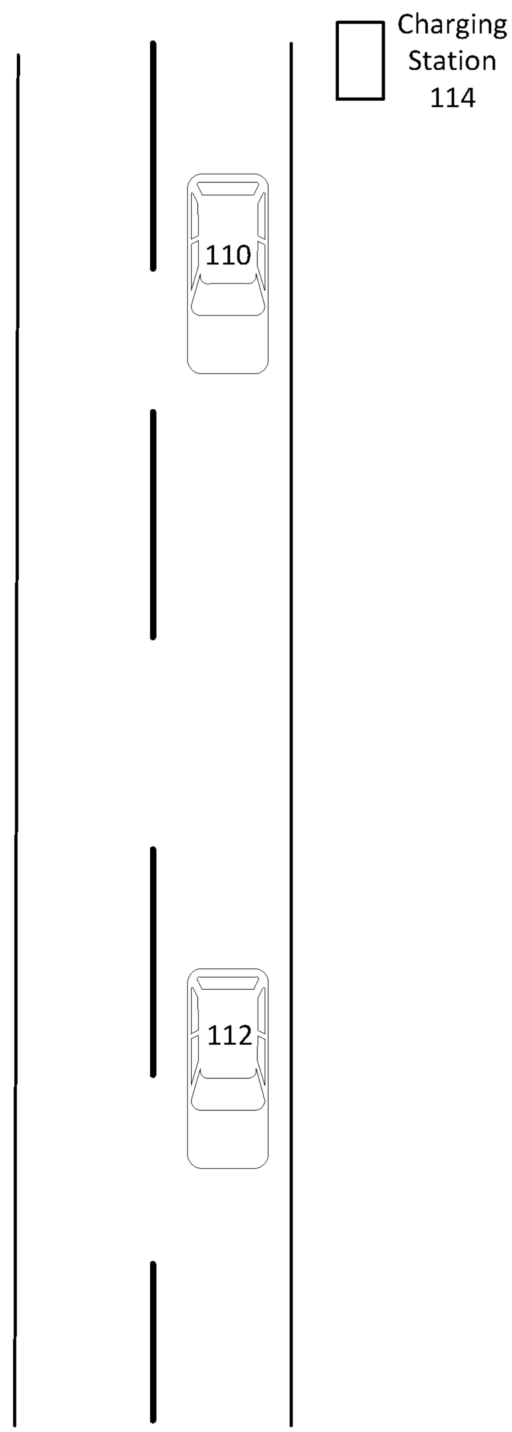
FIG. 1C illustrates an example vehicle-to-vehicle power transfer notification before the transfer, according to example embodiments.

A further example embodiment may include a charging station (FIG. 1C, 114) and a processor that determines an amount of stored energy in at least one storage unit (FIG. 1B, 134, 136) of a transport (FIG. 1C, 110). The processor may determine an amount of reserved energy to perform a set of transport tasks, determine an amount of available energy based on the amount of stored energy and a reserve energy and a discharge limit of the at least one storage unit (FIG. 1B, 134, 136). The processor may provide an indication of the amount of available energy of the at least one storage unit (FIG. 1B, 134, 136) of a transport and based on the indication, provide notification that a portion of the available energy is to be provided to the charging station (FIG. 1B, 134, 136) prior to being coupled. The transport (FIG. 1B, 110), communicates wirelessly (FIG. 1B, 116) with the charge station (FIG. 1B, 114) and communicates the state of charge of the storage unit (FIG. 1B, 134) of the transport and the location of the transport via a spatial location sensor (FIG. 1B, 128, 132) via a transceiver (FIG. 1B, 124, 126).

In other embodiments, the system may provide a location of the charging station to the at least one transport when at least one of a following occurs, the charging station wirelessly notifies the at least one transport of the needed amount of energy and the at least one transport confirms the needed amount of energy can be provided to the charging station. The charging station may wirelessly notify another transport of the group of identified transports of the needed amount of energy stored in the other transport prior to the at least one transport being connected to the charging station. The charging station may wirelessly notify the transport of the needed amount of energy stored in the transport based on an amount of energy stored in the transport and a time for the transport to arrive at the charging station.

The charging station may query, via the charging station, at least one transport of an amount of energy stored in the at least one transport and provide, via the at least one transport to the charging station, the amount of energy stored in the at least one transport. The charging station may also identify the group of identified transports based on a distance, speed, direction, an amount of energy stored in each of the group of identified transports, an estimated amount of energy stored in each of the group of identified transports when each of the group of identified transports arrives at the charging station, and an estimated amount of energy stored in each of the group of identified transports when each of the group of identified transports arrives at the charging station and can provide energy to the charging station.

Figure 1D:
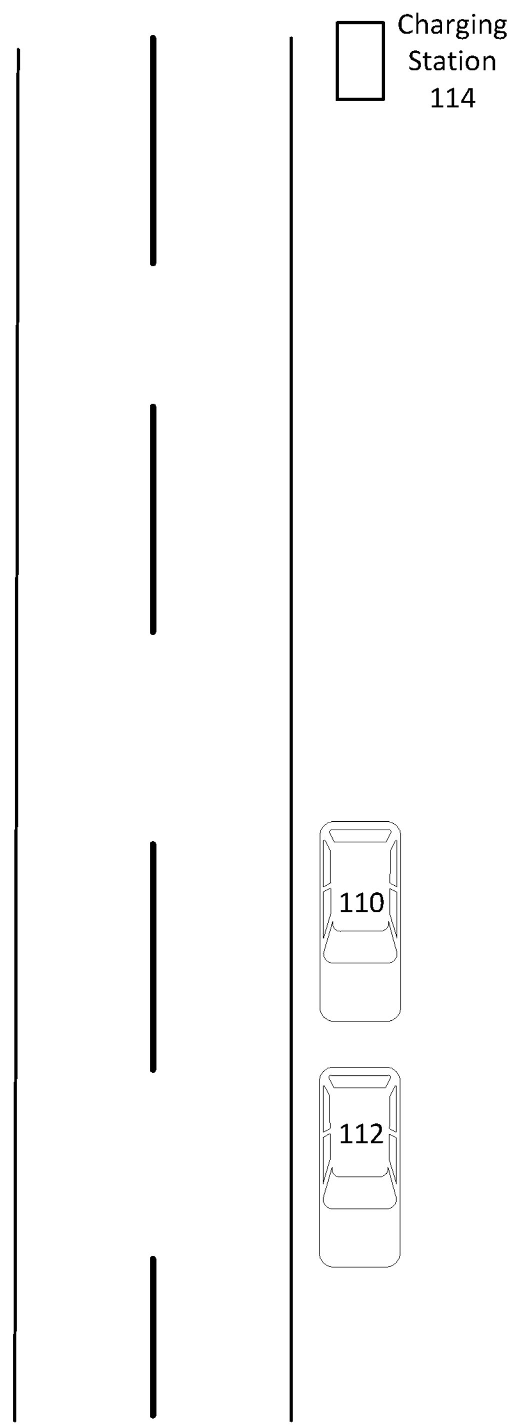
FIG. 1D illustrates an example vehicle-to-vehicle power transfer notification during the transfer, according to example embodiments.

FIG. 1C illustrates an example vehicle-to-vehicle power transfer notification before the transfer 150. The charging station (FIG. 1C, 114) may possess information about the energy status of each transport in its immediate vicinity and may inform one energy-rich transport (FIG. 1C, 110) of another transport near the energy-rich transport that is energy-depleted (FIG. 1C, 112) and does not have sufficient energy to reach its endpoint. FIG. 1D illustrates another example vehicle-to-vehicle power transfer notification before the transfer 160. In one embodiment, the charging system may schedule, but not directly participate in, a roadside transfer of energy from the energy-rich transport (FIG. 1D, 110) to the energy-depleted transport (FIG. 1D, 112), wherein the energy-depleted transport is not part of the group of identified transports. The roadside transfer may occur via charging cables connecting the energy-rich transport to the energy-depleted transport. In this case, neither the energy-rich nor the energy-depleted transport would be connected to the charging station, but would be directed by the charging station to perform an action so that both transports would be able to complete their journeys with no impact to the electrical grid (FIG. 1A, 142). In one example embodiment the coupling of the energy-rich transport and the energy-poor transport may be by way of direct electrical connection, inductive coupling and the like.

Figure 2A:
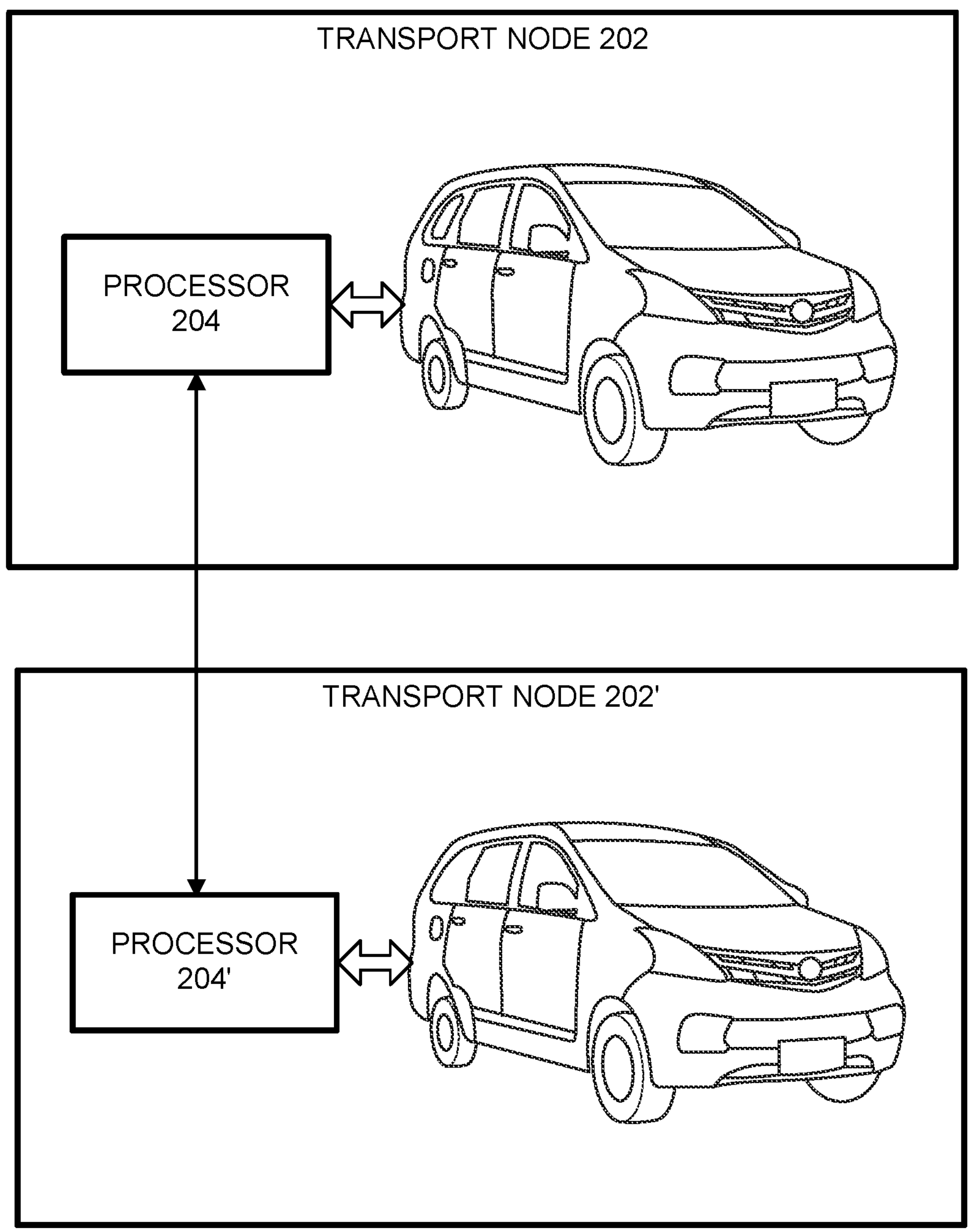
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
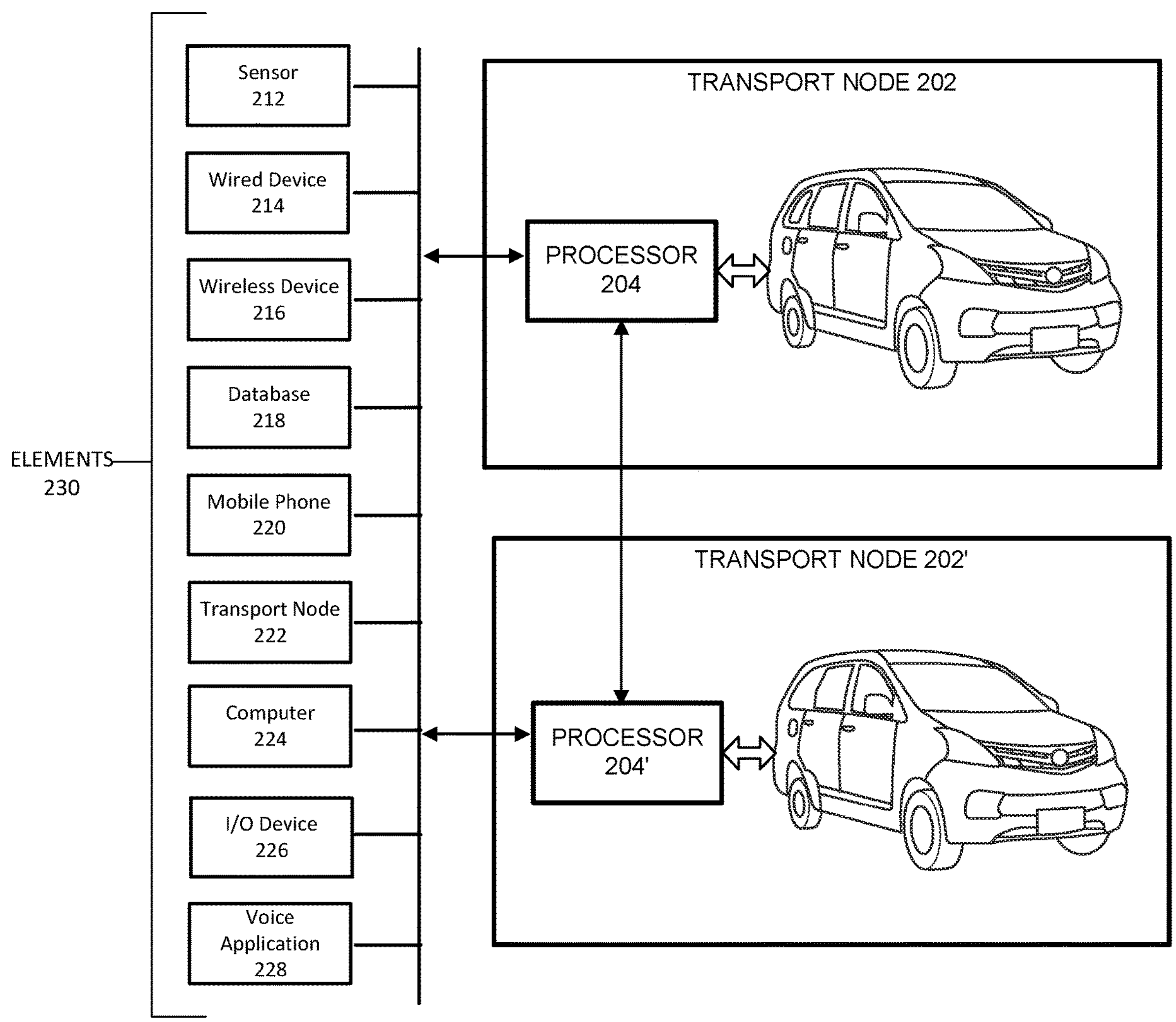
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204 which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
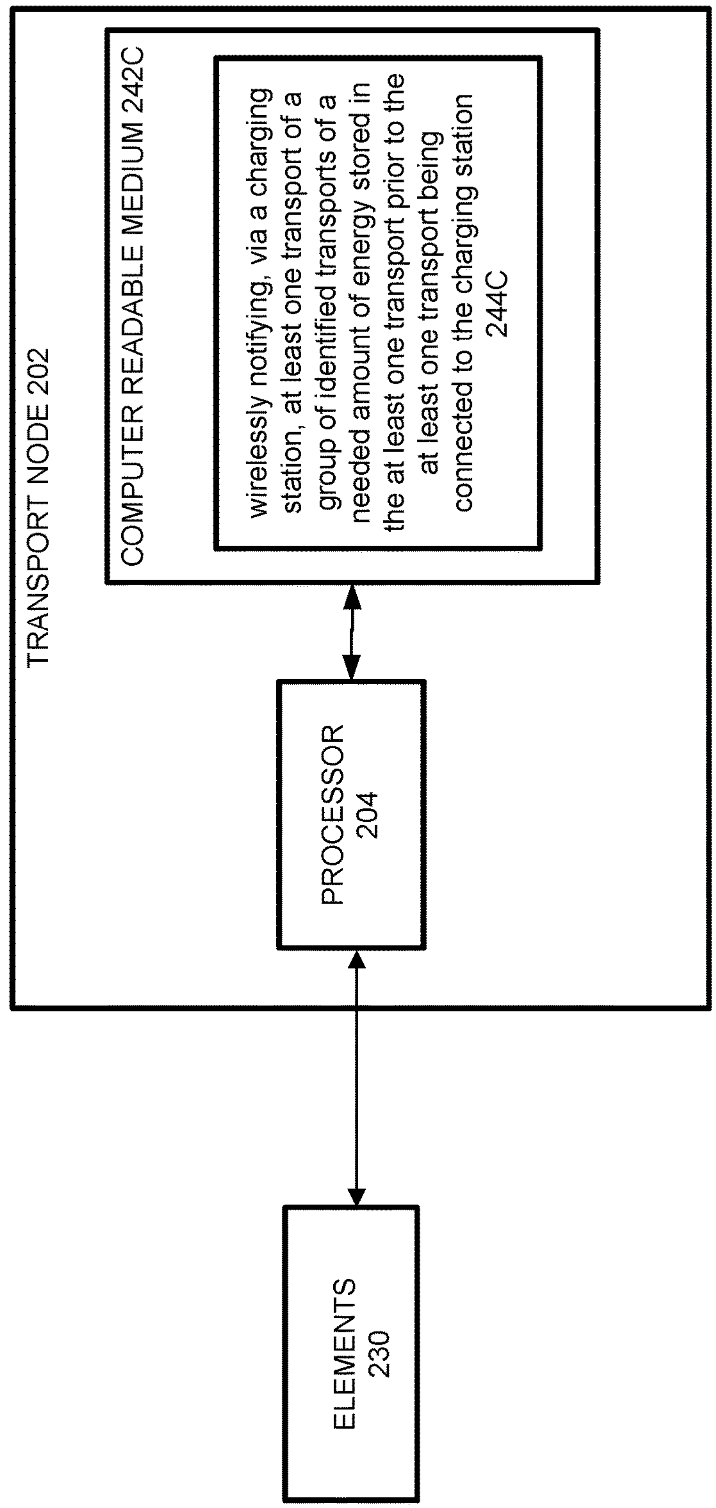
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the non-transitory computer readable medium 242C and elements 230 (which were depicted in FIG. 2B).

The processor 204 wirelessly notifies 244C, via a charging station, at least one transport of a group of identified transports of a needed amount of energy stored in the at least one transport prior to the at least one transport being connected to the charging station.

In other embodiments, the processor may provide a location of the charging station to the at least one transport when at least one of a following occurs, the charging station wirelessly notifies the at least one transport of the needed amount of energy and the at least one transport confirms the needed amount of energy can be provided to the charging station. The processor may wirelessly notify, via the charging station, at least one other transport of the group of identified transports of the needed amount of energy stored in the at least one other transport prior to the at least one transport being connected to the charging station. The processor may also wirelessly notify, via the charging station, the at least one transport of the needed amount of energy stored in the at least one transport based on an amount of energy stored in the at least one transport and a time for the at least one transport to arrive at the charging station. The processor may also query, via the charging station, the at least one transport of an amount of energy stored in the at least one transport and provide, via the at least one transport to the charging station, the amount of energy stored in the at least one transport. The processor may also identify, via the charging station, the group of identified transports based on a distance, speed, direction, an amount of energy stored in each of the group of identified transports, an estimated amount of energy stored in each of the group of identified transports when each of the group of identified transports arrives at the charging station, and an estimated amount of energy stored in each of the group of identified transports when each of the group of identified transports arrives at the charging station and can provide energy to the charging station.

In another example, a non-transitory computer readable medium comprising instructions, that when read by a processor, causes the processor to perform, providing a wireless notification to at least one transport of a group of identified transports of an indication of a needed amount of energy stored in the at least one transport prior to the at least one transport being connected to a charging station and providing a wireless notification to at least one other transport of the group of identified transports of an indication of a needed amount of energy stored in the at least one other transport to provide a portion of the amount of the energy to the charging station prior to the at least one transport being connected to the charging station.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
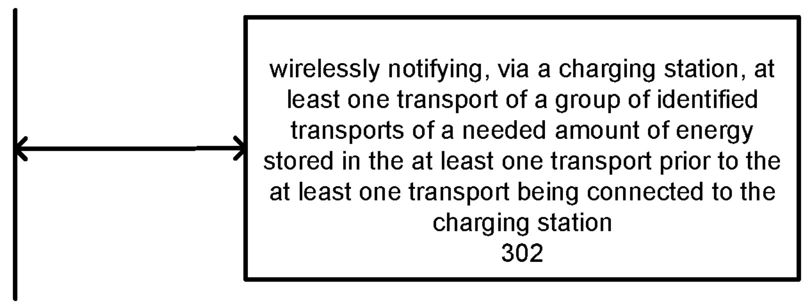
FIG. 3A illustrates a first flow diagram, according to example embodiments.

FIG. 3A illustrates a flow diagram 300, according to example embodiments. Referring to FIG. 3A, the flow comprises wirelessly notifying 302, via a charging station, at least one transport of a group of identified transports of a needed amount of energy stored in the at least one transport prior to the at least one transport being connected to the charging station.

In other embodiments, the method may provide a location of the charging station to the at least one transport when at least one of a following occurs, the charging station wirelessly notifies the at least one transport of the needed amount of energy and the at least one transport confirms the needed amount of energy can be provided to the charging station. The method may also wirelessly notify, via the charging station, at least one other transport of the group of identified transports of the needed amount of energy stored in the at least one other transport prior to the at least one transport being connected to the charging station and may wirelessly notify, via the charging station, the at least one transport of the needed amount of energy stored in the at least one transport based on an amount of energy stored in the at least one transport and a time for the at least one transport to arrive at the charging station. The processor may also query, via the charging station, the at least one transport of an amount of energy stored in the at least one transport and provide, via the at least one transport to the charging station, the amount of energy stored in the at least one transport. The processor may also identify, via the charging station, the group of identified transports based on a distance, speed, direction, an amount of energy stored in each of the group of identified transports, an estimated amount of energy stored in each of the group of identified transports when each of the group of identified transports arrives at the charging station, and an estimated amount of energy stored in each of the group of identified transports when each of the group of identified transports arrives at the charging station and can provide energy to the charging station.

In another example, a method includes wirelessly notifying, via a processor, at least one transport of a group of identified transports of an indication of a needed amount of energy stored in the at least one transport prior to the at least one transport being connected to a charging station. The method may also include wirelessly notifying, via the processor, at least one other transport of the group of identified transports of an indication of a needed amount of energy stored in the at least one other transport to provide a portion of the amount of the energy to the charging station prior to the at least one transport being connected to the charging station.

Figure 4:
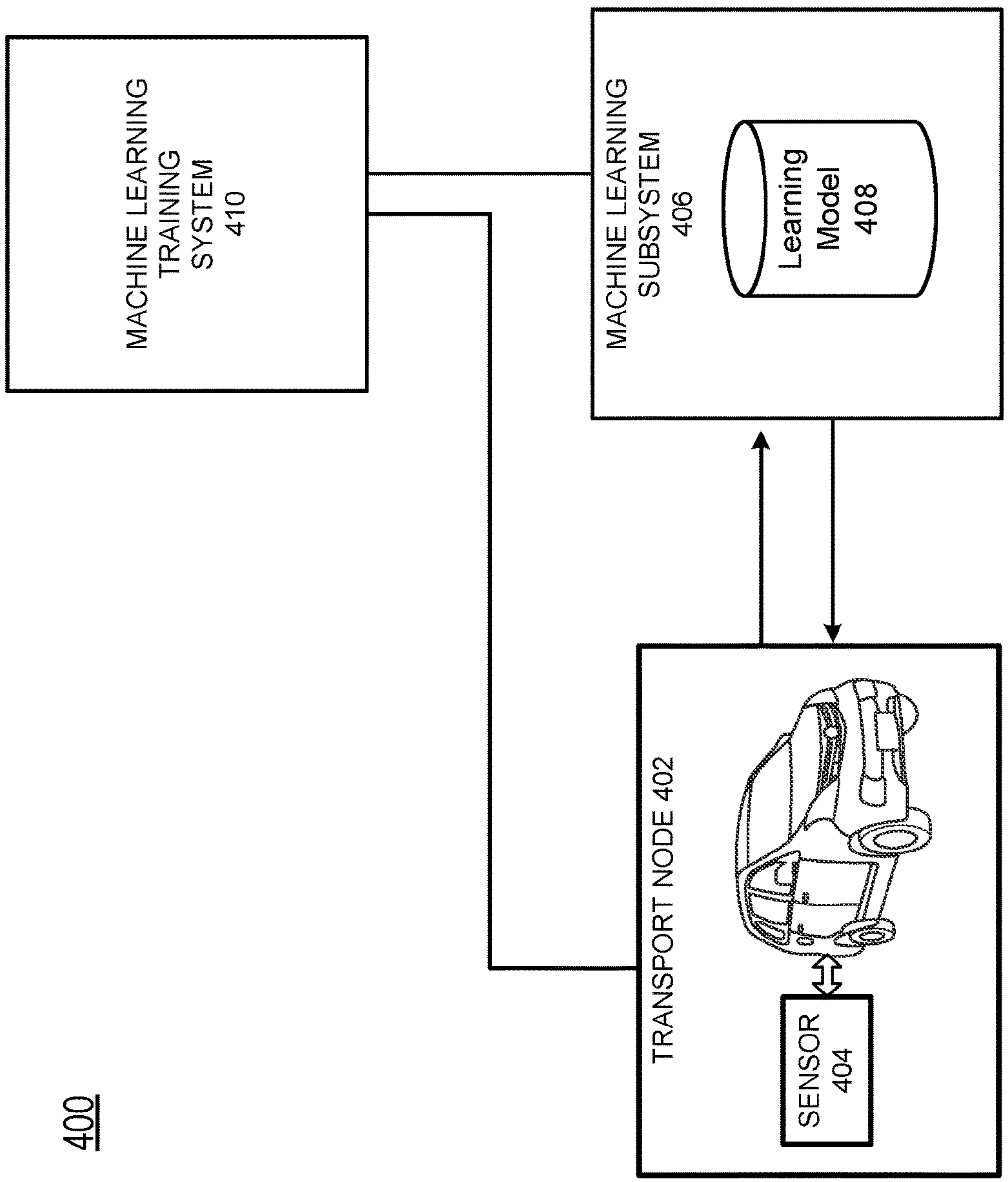
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408 which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
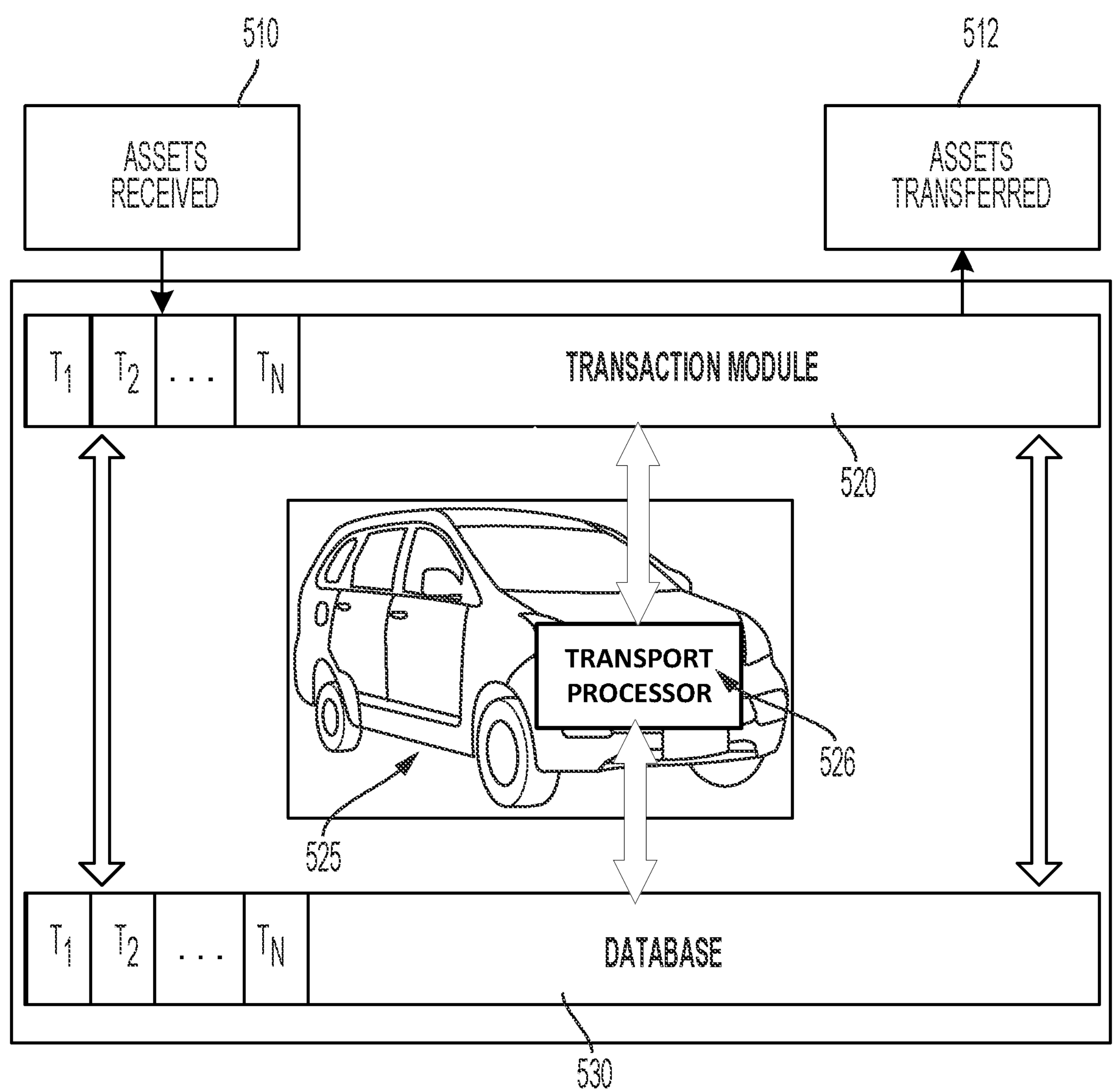
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
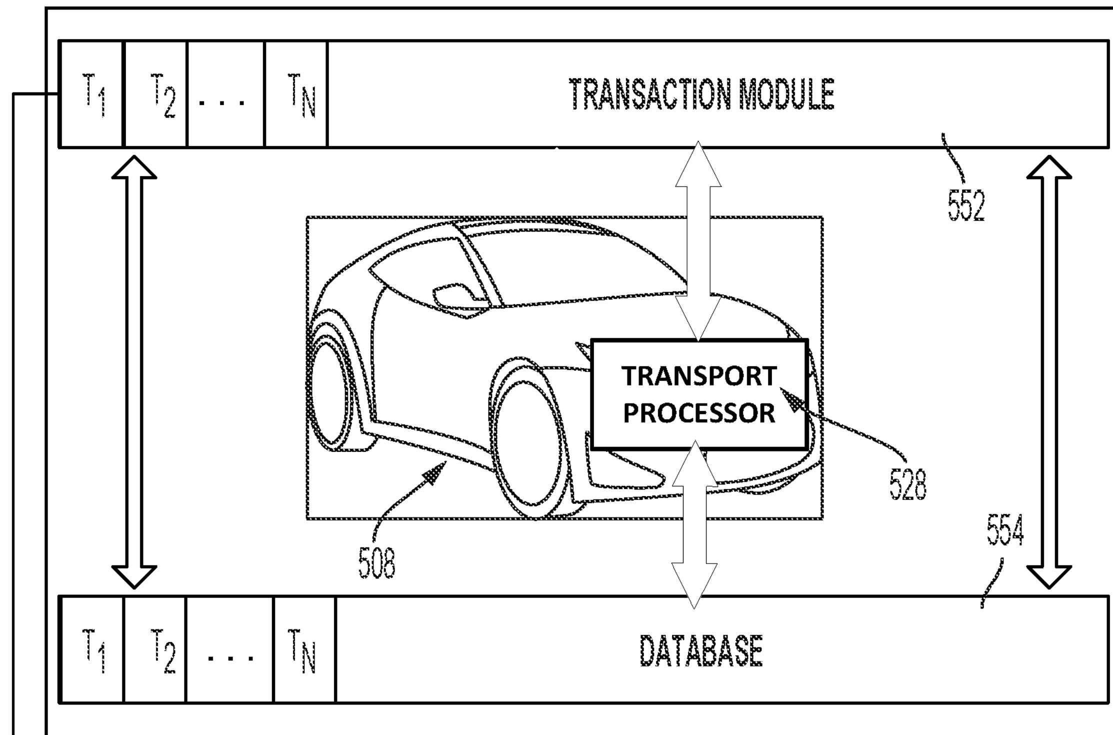
FIG. 5B illustrates another example vehicle configuration for managing database transactions conducted among various vehicles, according to example embodiments
Figure 5B:
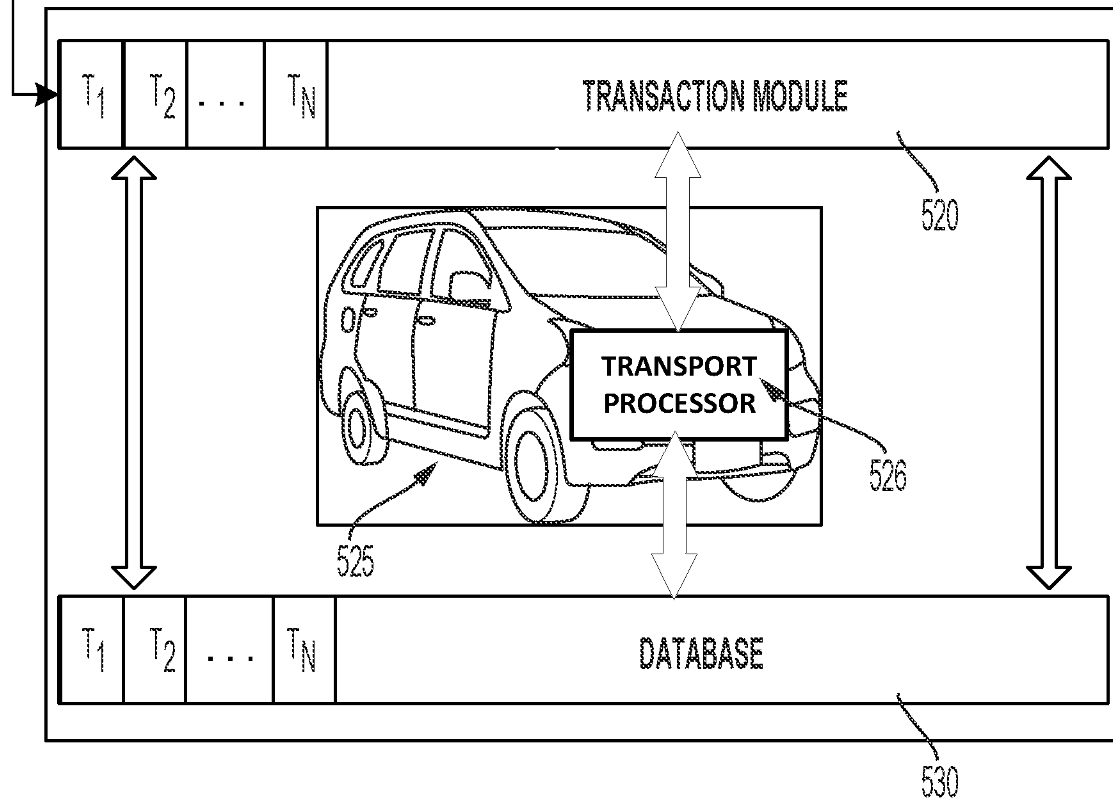

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
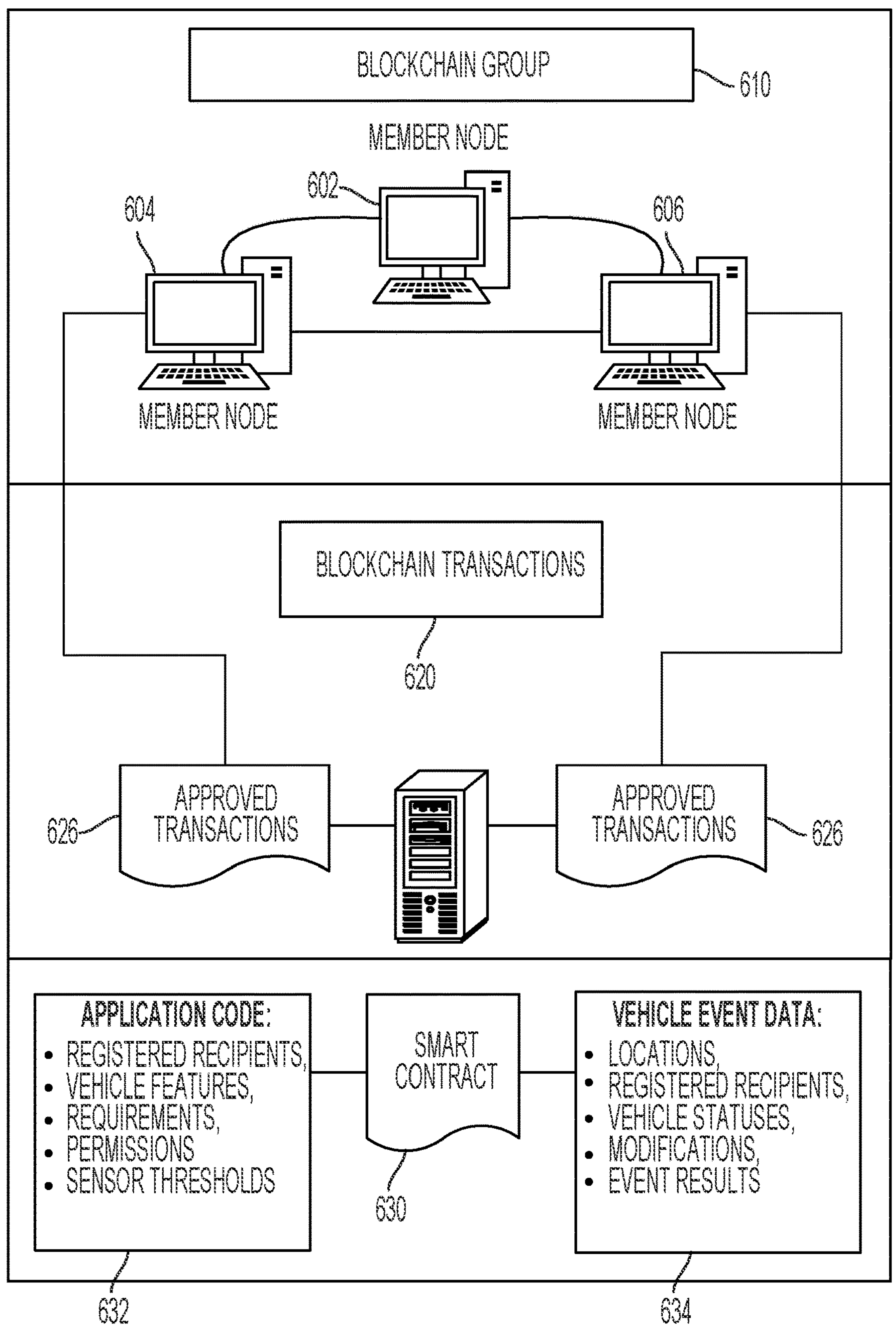
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next endpoint, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
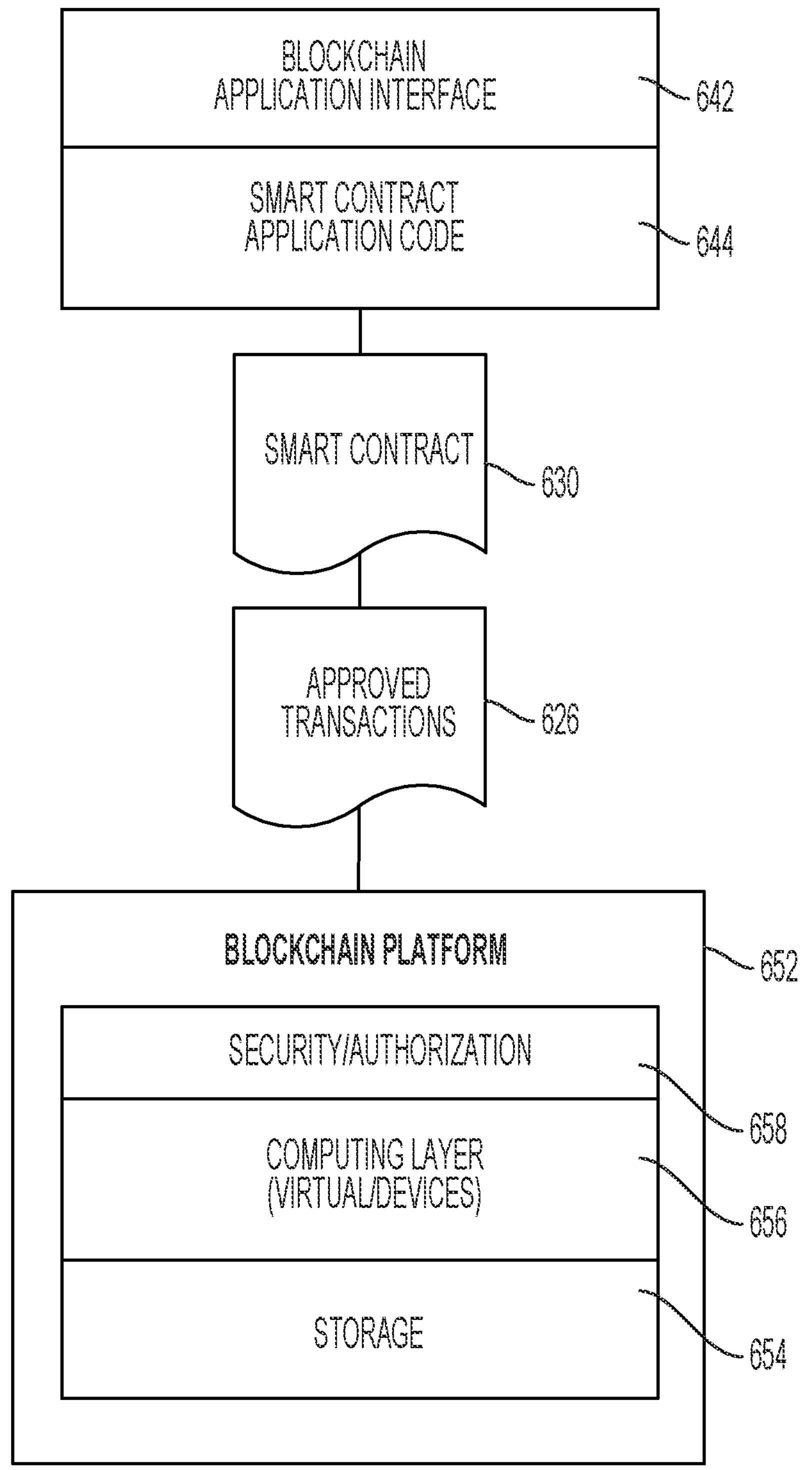
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an application programming interface or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
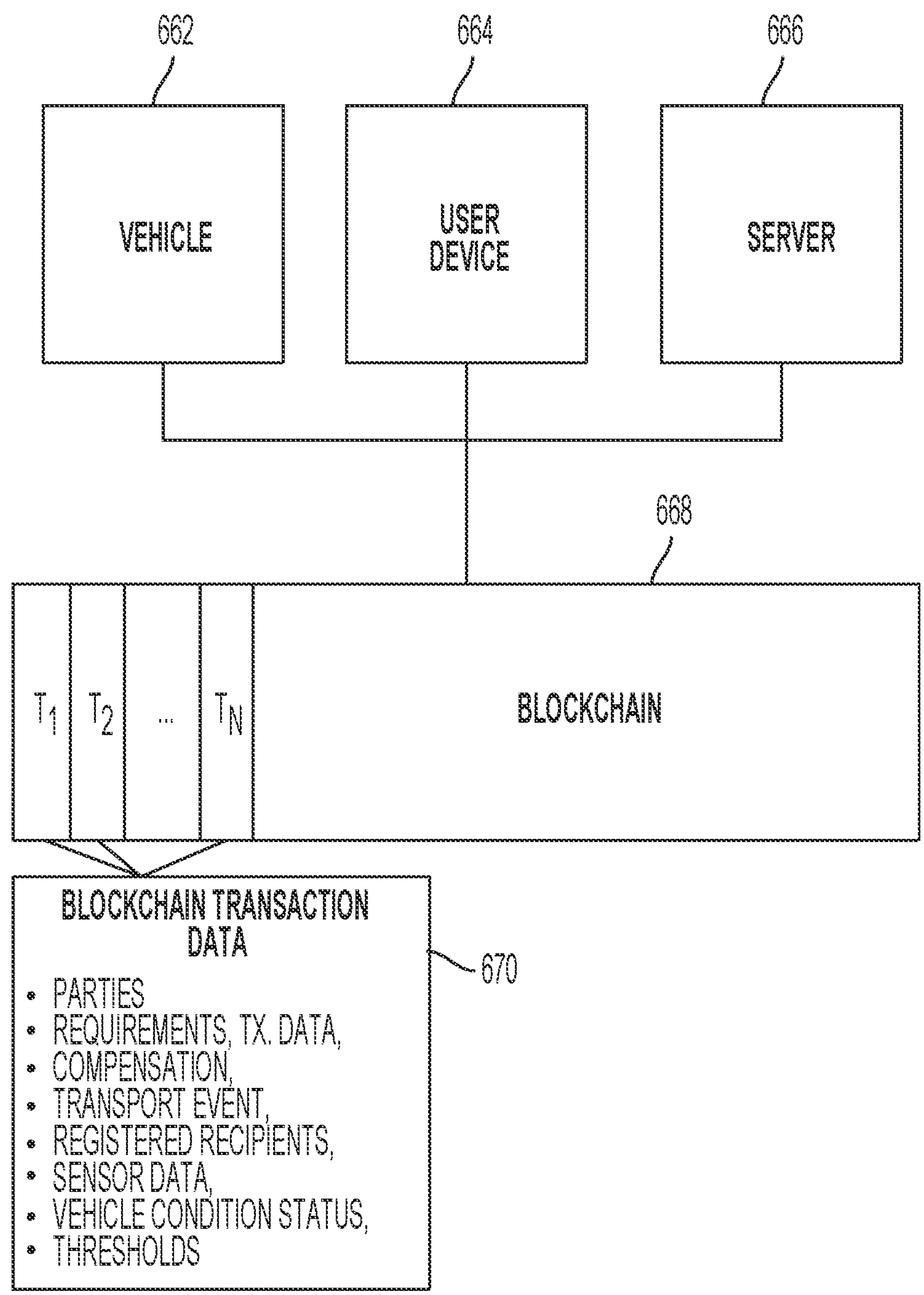
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
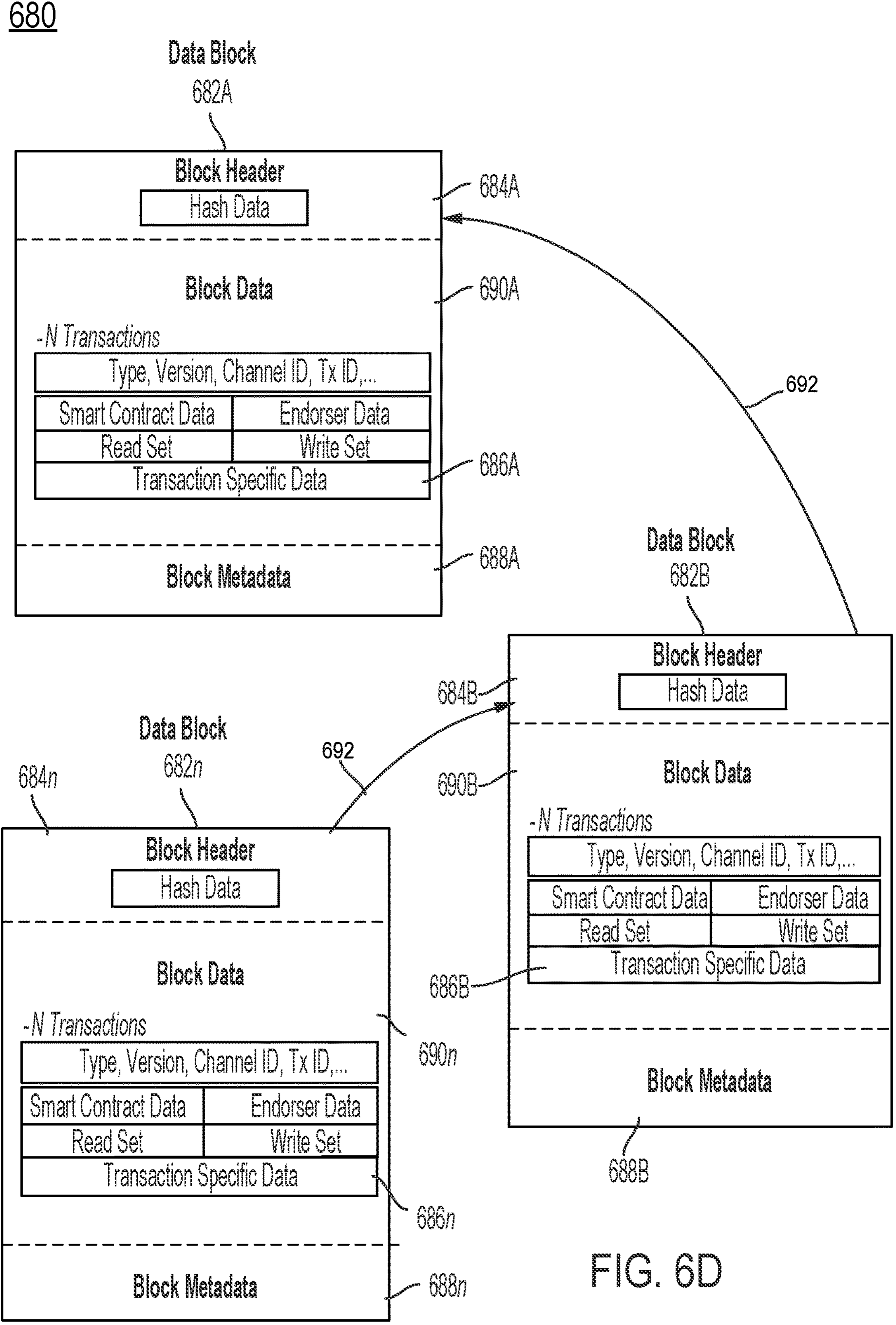
FIG. 6D illustrates example data blocks, according to example embodiments.

FIG. 6D illustrates blockchain blocks 680 that can be added to a distributed ledger, according to example embodiments, and contents of block structures 682A to 682*n*. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682*n* in the blockchain also have headers, files, and values. However, unlike the first block 682A, each of the headers 684A to 684*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
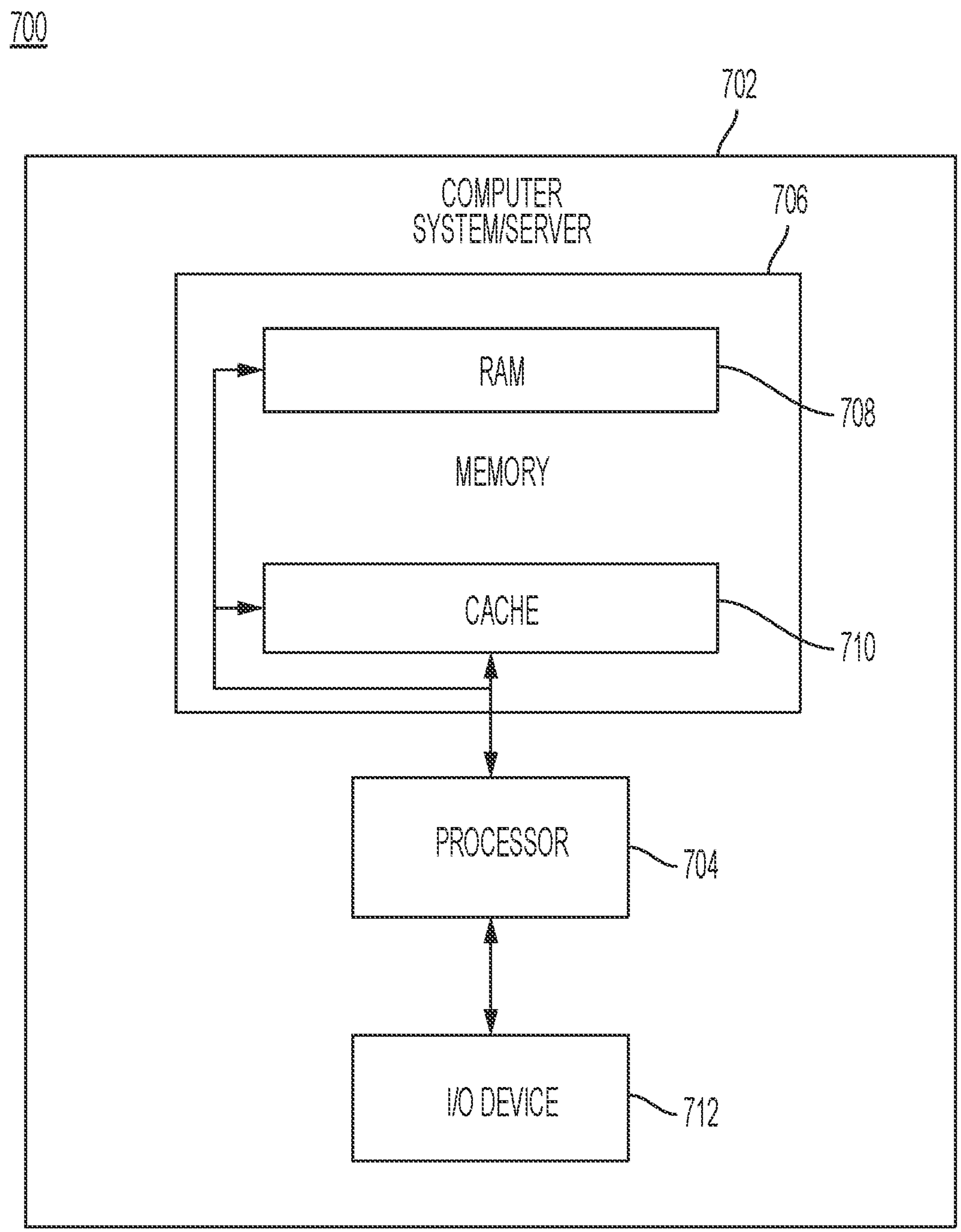
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices.

Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:

requesting, via a charging station, an amount of energy from a group of transports prior to at least one transport of the group being connected to the charging station;

receiving, via the charging station, a current charge level and travel information of the group of transports; and selecting, via the charging station, at least one of the group of transports to provide charge to the charging station based on the current charge level and travel information.

2. The method of claim 1, comprising, providing a location of the charging station to the at least one transport when at least one of a following occurs:

the charging station wirelessly notifies the at least one transport of the needed amount of energy; and the at least one transport confirms the needed amount of energy can be provided to the charging station.

3. The method of claim 1, comprising, wirelessly notifying, via the charging station, at least one other transport of the group of identified transports of the needed amount of energy stored in the at least one other transport prior to the at least one transport being connected to the charging station.

4. The method of claim 1, comprising, wirelessly notifying, via the charging station, the at least one transport of the needed amount of energy stored in the at least one transport based on an amount of energy stored in the at least one transport and a time for the at least one transport to arrive at the charging station.

5. The method of claim 1, comprising, performing at least one of:

querying, via the charging station, the at least one candidate transport of an amount of energy stored in the at least one candidate transport; and providing, via the at least one candidate transport to the charging station, the amount of energy stored in the at least one candidate transport.

6. The method of claim 1, comprising, identifying, via the charging station, the group of identified transports based on a distance, speed, direction, an amount of energy stored in each of the group of identified transports, an estimated amount of energy stored in each of the group of identified transports when each of the group of identified transports arrives at the charging station, and an estimated amount of energy stored in each of the group of identified transports when each of the group of identified transports arrives at the charging station and can provide energy to the charging station.

7. The method of claim 1, comprising, wirelessly notifying, via the charging station, the at least one transport of the group of identified transports of the needed amount of energy by an energy depleted transport and a location of the energy depleted transport, wherein the energy depleted transport is not part of the group of identified transports.

8. A system, comprising:

a group of transports; and a charging station configured to request, via a charging station, an amount of energy from a group of transports prior to at least one transport of the group being connected to the charging station;

receive, via the charging station, a current charge level and travel information of the group of transports; and select, via the charging station, at least one of the group of transports to provide charge to the charging station based on the current charge level and travel information.

9. The system of claim 8, wherein a location of the charging station is provided to the at least one transport when at least one of a following occurs:

the charging station wirelessly notifies the at least one transport of the needed amount of energy; and the at least one transport confirms the needed amount of energy can be provided to the charging station.

10. The system of claim 8, wherein the charging station is configured to wirelessly notify at least one other transport of the group of identified transports of the needed amount of energy stored in the at least one other transport prior to the at least one transport being connected to the charging station.

11. The system of claim 8, wherein the charging station is configured to wirelessly notify the at least one transport of the needed amount of energy stored in the at least one transport based on an amount of energy stored in the at least one transport and a time for the at least one transport to arrive at the charging station.

12. The system of claim 8, wherein the charging station is configured to perform at least one of:

query, via the charging station, the at least one candidate transport of an amount of energy stored in the at least one candidate transport; and provide, via the at least one candidate transport to the charging station, the amount of energy stored in the at least one candidate transport.

13. The system of claim 8, wherein the charging station is configured to identify the group of identified transports based on a distance, speed, direction, an amount of energy stored in each of the group of identified transports, an estimated amount of energy stored in each of the group of identified transports when each of the group of identified transports arrives at the charging station, and an estimated amount of energy stored in each of the group of identified transports when each of the group of identified transports arrives at the charging station and can provide energy to the charging station.

14. The system of claim 8, wherein the charging station is configured to wirelessly notify the at least one transport of the group of identified transports of the needed amount of energy by an energy depleted transport and a location of the energy depleted transport.

15. A non-transitory computer readable medium comprising instructions, that when read by a processor, cause the processor to perform:

requesting, via a charging station, an amount of energy from a group of transports prior to at least one transport of the group being connected to the charging station;

receiving, via the charging station, a current charge level and travel information of the group of transports; and selecting, via the charging station, at least one of the group of transports to provide charge to the charging station based on the current charge level and travel information.

16. The non-transitory computer readable medium of claim 15, comprising instructions, that when read by a processor, cause the processor to perform providing a location of the charging station to the at least one transport when at least one of a following occurs:

the charging station wirelessly notifies the at least one transport of the needed amount of energy; and the at least one transport confirms the needed amount of energy can be provided to the charging station.

17. The non-transitory computer readable medium of claim 15, comprising instructions, that when read by a processor, cause the processor to perform wirelessly notifying, via the charging station, at least one other transport of the group of identified transports of the needed amount of energy stored in the at least one other transport prior to the at least one transport being connected to the charging station.

18. The non-transitory computer readable medium of claim 15, comprising instructions, that when read by a processor, cause the processor to perform wirelessly notifying, via the charging station, the at least one transport of the needed amount of energy stored in the at least one transport based on an amount of energy stored in the at least one transport and a time for the at least one transport to arrive at the charging station.

19. The non-transitory computer readable medium of claim 15, comprising instructions, that when read by a processor, cause the processor to perform at least one of:

querying, via the charging station, the at least one candidate transport of an amount of energy stored in the at least one candidate transport; and providing, via the at least one candidate transport to the charging station, the amount of energy stored in the at least one candidate transport.

20. The non-transitory computer readable medium of claim 15, comprising instructions, that when read by a processor, cause the processor to perform, identifying, via the charging station, the group of identified transports based on a distance, speed, direction, an amount of energy stored in each of the group of identified transports, an estimated amount of energy stored in each of the group of identified transports when each of the group of identified transports arrives at the charging station, and an estimated amount of energy stored in each of the group of identified transports when each of the group of identified transports arrives at the charging station and can provide energy to the charging station.

* * * * *